United States Patent [19]

Meunier

[11] Patent Number: 5,022,901

[45] Date of Patent: Jun. 11, 1991

[54] COMPRESSION SEAL CANISTER

[75] Inventor: Pierre P. Meunier, Nepean, Canada

[73] Assignee: Her Majesty the Queen in right of Canada, as represented by the Minister of National Defence, Canada

[21] Appl. No.: 343,742

[22] Filed: Apr. 27, 1989

[30] Foreign Application Priority Data

Sep. 22, 1988 [CA] Canada ........ 578167

[51] Int. Cl.$^5$ ........ B01D 50/00

[52] U.S. Cl. ........ 55/316; 55/502; 55/521

[58] Field of Search ........ 55/316, 502, 521, 524, 55/509

[56] References Cited

U.S. PATENT DOCUMENTS 3,296,781 1/1967 Schumann ........ 55/502 X
3,385,034 5/1968 Farr ........ 55/502 X
4,236,901 12/1980 Kato et al. ........ 55/509 X
4,278,455 7/1981 Nardi ........ 55/337
4,543,112 9/1985 Ackley et al. ........ 55/316
4,714,486 12/1987 Silverthorn ........ 55/316

FOREIGN PATENT DOCUMENTS 1247524 9/1971 United Kingdom .
1318773 5/1973 United Kingdom .
1446195 8/1976 United Kingdom .
1553926 10/1979 United Kingdom .
2140310 11/1984 United Kingdom .

*Primary Examiner*—Charles Hart
*Attorney, Agent, or Firm*—Stevens, Davis, Miller & Mosher

[57] ABSTRACT

A pleated paper filter is installed in a gas mask filter canister without the use of adhesives. The paper filter has an annular sealing ring around it of polyurethane. The polyurethane sealing ring has an outer downwardly tapered face that is a force fit inside the canister housing. A retainer on top of the pleated paper filter element has a peripheral flange that engages the seal above the pleated paper and restricts its inward deformation, so that the sealing force between the seal and the wall of the housing is very high.

18 Claims, 3 Drawing Sheets

COMPRESSION SEAL CANISTER

The present invention relates to canisters and more particularly to canisters such as those used in gas masks for protection against toxic agents.

The known canisters are satisfactory in many respects, but are subject to certain manufacturing limitations. In the manufacture of the existing canisters an adsorbent material, normally charcoal, is deposited in a level bed in the bottom of a canister. Pressure is applied to the charcoal bed and a diaphragm is locked in place under pressure by rolling a groove in the canister body to keep pressure on the bed. A preformed filter for particulate materials and a top diaphragm are then placed over the charcoal bed, with an adhesive sealant around the outer edge. After four hours of exposure the adhesive is sufficiently cured that a cover may be mounted on the canister. The canister may then be sealed with a rubber plug pushed into the inlet opening in the cover and a screw cover fitted to the bottom outlet opening.

With this procedure, the charcoal is left exposed to ambient conditions in the assembly area for a considerable time (4 hours or more). The adhesive used currently is a room temperature vulcanizing silicone sealer that requires moisture in the ambient atmosphere in order to cure. This may lead to an excessive moisture content in the hydroscopic carbon. The assembly plant can be air conditioned to provide a very dry atmosphere, but this is contrary to the requirements for curing the sealer, is expensive and causes discomfort to workers in the area.

Furthermore, the full curing time of the sealant is up to 16 hours, so that the sealant continues to cure inside the closed container. A by-product of this curing is acetic acid, which accumulates in the canister and makes the initial use of the canister very unpleasant.

The present invention is concerned with a solution to this problem.

According to one aspect of the present invention there is provided a particulate filter for use in a gas mask filter canister comprising a filter element and a sealing ring extending peripherally around the filter element, the sealing ring having a tapered outer face for a force fit engagement with an inner face of the filter canister housing.

The compression seal produced by the ring eliminates the four hour adhesive curing time during which the charcoal adsorbent is exposed to the ambient assembly area atmosphere. The new canister and filter also lend themselves more fully to an automated assembly process than does the prior art canister.

In the accompanying drawings, which illustrate exemplary embodiments of the present invention:

Figure 1:
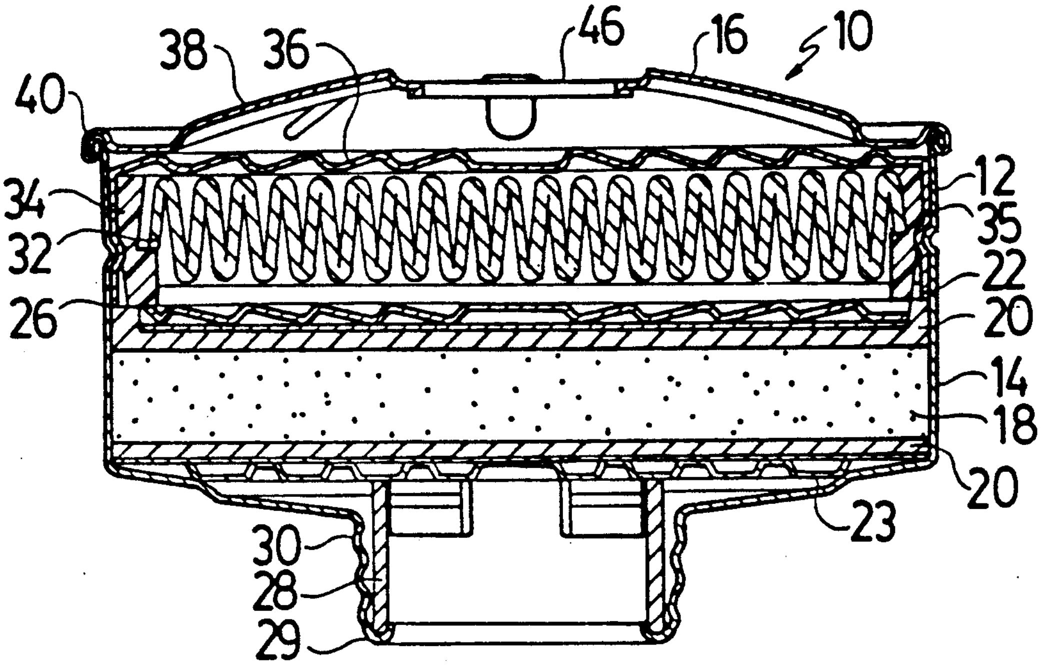
FIG. 1 (PRIOR ART)
FIG. 1 is a cross section of a prior art canister.

Referring to the drawings, and particularly to FIG. 1, there is illustrated a prior art canister 10. This canister has a canister body consisting of a housing 14 and a cover 16. The housing 14 accommodates a bed of activated charcoal 18 sandwiched between layers of an appropriate retaining medium 20 that serves to confine the charcoal to its bed while permitting the passage of gas through it.

Annularly corrugated retainers 22 and 23 are mounted on opposite sides of the charcoal bed. Retainer 22 is assembled with pressure on the bed of charcoal 18 then locked in place with a grooving wheel acting on the exterior wall of the canister. Deflection of the retainer 23 is resisted by an annular support sleeve 28 that extends from the bottom of the retainer 23 to a flange 29 on a threaded mounting coupling 30 of the canister housing 14.

Mounted in the canister above the charcoal bed is a pleated paper filter 32 surrounded by a polyurethane gasket 34. The gasket 34 is sealed to the inside wall of the container housing 14 by an adhesive seal 35. An annularly corrugated diaphragm 36 is mounted on the top of the filter 32. The canister housing is closed by a cover 38 joined to the side wall of the housing 14 by a double rolled seam 40. This is a standard seam used in canning. The center of the cover has a circular opening 46 to provide for the passage of air to be purified into the canister.

The canister illustrated in FIG. 1 is subject to certain disadvantages. Because the charcoal bed 18 is installed in the housing 14 as one of the first steps in assembly, and because it takes roughly sixteen hours to cure the adhesive joining the polyurethane gasket 34 of the pleated paper filter 32 to the housing 14, the charcoal is exposed to the ambient atmosphere in the assembly area for a lengthy time, at least sufficient time for the adhesive to develop a skin.

Figure 2:
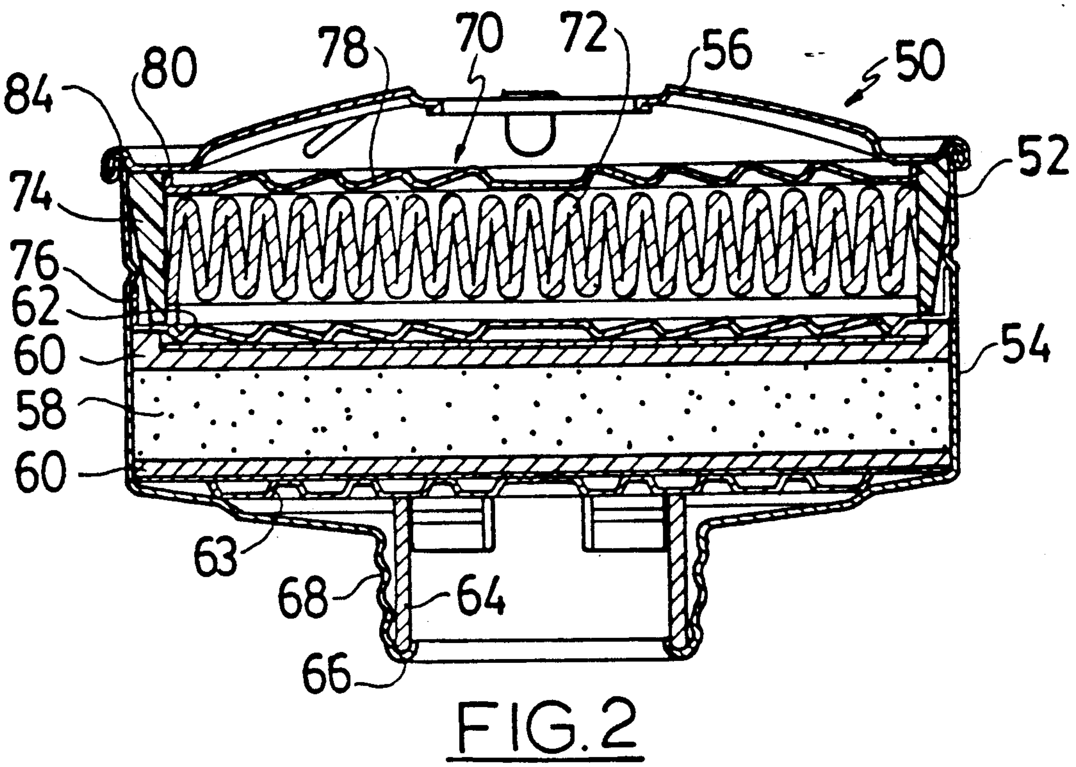
FIG. 2 is a similar cross section of a canister according to the present invention.

A new canister design that addresses this problem is illustrated in FIG. 2. The canister 50 has a canister body 52 consisting of a housing 54 and a cover 56. The housing accommodates a bed of activated charcoal 58 sandwiched between layers of an appropriate retaining means 60 that confines the charcoal to the bed while permitting the passage of gas through it. Two annularly corrugated retainers 62 and 63 are fitted on opposite sides of the charcoal bed. Deflection of the lower retainer 63 is resisted by an annular support sleeve 64 that extends from the bottom of the retainer to a flange 66 on a threaded coupling 30 of the canister.

Mounted in the canister above the charcoal bed is a particulate filter 70. This is a pleated paper filter medium 72 surrounded by a sealing ring 74 of resilient polyurethane material. The sealing ring is molded onto the outer periphery of the paper filter. The lower end of the sealing ring extends over the inside face of a flange 76 at the periphery of the retainer 62. The flange extends along the inside face of the housing. At the top of the filter 70, above the paper component 72 is a retainer 78 with a peripheral flange 80 that engages the sealing ring 74 above the paper and compresses it against the inside wall of the housing 54. The cover 56 is secured to the side wall of the housing 54 with a seam 84 and compresses the sealing ring 74 vertically.

Figure 3:
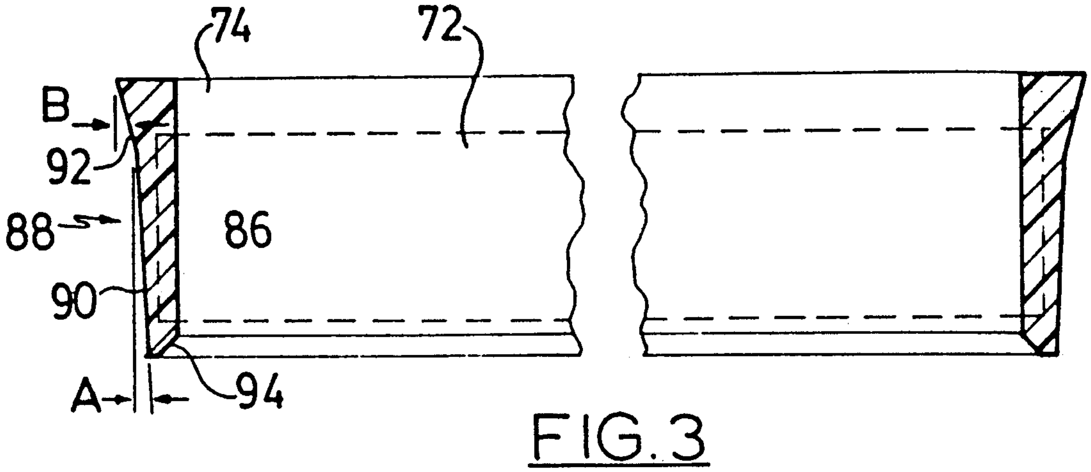
FIG. 3 is a cross section of a filter for use in a canister according to the presentation invention.

The relaxed configuration of the sealing ring 74 is illustrated most particularly in FIG. 3. As will be observed from that Figure, the sealing ring extends above and below the paper filter component 72. It has an inner cylindrical face 86 and an outer face 88 that tapers from the top to the bottom. The outer face 88 has a lower section 90 with a taper angle A of about 3° and an upper section 92 with a taper angle B of about 15°. Between the bottom face and the inner face 86 there is a bevelled surface 94.

Figure 4:
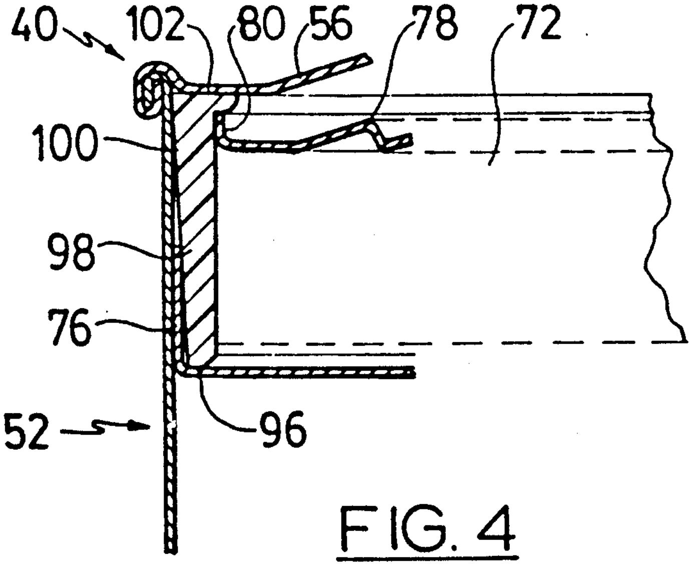
FIG. 4 is a detail view showing the interaction of the canister housing, the sealing ring and the retainer.

When the filter is installed in the canister body, the sealing ring 74 is deformed as illustrated in FIG. 4. The inner face of the housing 54 is cylindrical and of smaller diameter than at least the upper section 92 of the sealing ring. Thus, the lower end of the sealing ring may be inserted into the housing, on the inside of retainer flange 76, to engage the retainer and form a seal at 96 along the bottom edge of the sealing ring 74. Towards the top of the retainer flange 76, the outer face of the sealing ring engages the inner face of the flange 76 to provide a second annular seal 98. Near the top, where the upper section 92 of the outer face is compressed against the inside face of the housing 54, there is yet another seal area 100. In this case, the deformation of the sealing ring is resisted by the peripheral flange 80 on the retainer 78 so as to provide a very strong engagement between the sealing ring and the side wall of the housing. When the cover 56 is installed and the chime completed, the cover presses down on the top face of the sealing ring 74 to provide a further seal 102.

A compression seal produced in this way can be made very quickly, without the need for additional adhesives and the consequent exposure of the charcoal to moist ambient conditions for a lengthy time, and without the generation of undesirable vapors in the sealed unit.

While one embodiment of the invention has been described in the foregoing, it is to be understood that other embodiments are possible within the scope of the invention. Thus, while the unit described in the foregoing has been described as circular or cylindrical, it is to be understood that other shapes are possible within the scope of the invention. The invention is to be considered limited solely by the scope of the appended claims.

I claim:

1. A filter canister for use on a gas mask, comprising:

a canister housing having an annular peripheral wall with an inner cylindrical surface;

a filter for particulate materials in the housing, the filter including a filter element surrounded by an annular sealing ring of resiliently compressible elastomeric material; and means for engaging an inner peripheral surface of the sealing ring and compressing the sealing ring radially against the inner cylindrical surface of the peripheral wall of the housing.

2. A filter canister according to claim 1 wherein the sealing ring has a relaxed lateral dimension greater than the inside lateral dimension of the housing.

3. A filter canister according to claim 2 wherein in the relaxed state the sealing ring has a tapered thickness from one end face to the other.

4. A filter according to claim 3 wherein in the relaxed state the sealing ring has a cylindrical inner face.

5. A filter canister according to claim 4 wherein in the relaxed state the sealing ring has an outer face with adjacent first and second sections, the first section having a substantially smaller taper angle than the second section.

6. A filter canister according to claim 5 wherein in the relaxed state of the sealing ring, the first section has a taper angle of about 3°.

7. A filter canister according to claim 6 wherein in the relaxed state of the sealing ring the second section has a taper angle of about 15°.

8. A filter canister according to claim 7 wherein in the relaxed state the sealing ring has an axial length greater than that of the filter element and extends beyond each side of the filter element.

9. A filter canister according to claim 8 wherein the sealing ring is axially compressed by a canister cover.

10. A filter canister according to claim 9 wherein the means for compressing the sealing ring comprise a filter retainer positioned on top of the filter element and having a periphery in engagement with the sealing ring.

11. A filter canister according to claim 10 wherein the retainer has a peripheral flange substantially parallel to the inner cylindrical surface of the peripheral wall of the housing.

12. A particulate filter for use in a gas mask filter canister comprising a filter element and a resiliently compressible sealing ring tapered in cross section and extending peripherally around the filter element, the sealing ring having an outer face for a force fit engagement with an annular inner face of a filter canister housing, the sealing ring having an inner peripheral surface and means for engaging and compressing said inner peripheral surface radially against said annular inner face of said canister housing.

13. A filter according to claim 12 wherein the sealing ring has a cylindrical inside face.

14. A filter according to claim 13 wherein the outer face of the sealing ring has first and second tapered sections of different taper angles.

15. A filter according to claim 14 wherein the first section of the outer face has a taper angle of about 3°.

16. A filter according to claim 15 wherein the second section of the outer face has a taper angle of about 15°.

17. A filter according to claim 12 wherein the sealing ring has an axial length greater than that of the filter element and extends beyond opposite sides of the filter element.

18. A filter canister for use on a gas mask comprising:

a canister housing having an annular peripheral wall with an inner cylindrical surface and means for securing a cover to the top of said housing;

a filter for particulate materials for positioning within said housing, the filter including a filter element having an annular compressible elastomeric sealing ring secured to its outer periphery;

retainer means within said housing being spaced to define a fixed height between it and a cover on the top of said housing for receiving said compressible elastomeric sealing ring;

means on said filter to define a fixed inner diameter for said resilient elastomeric sealing ring;

said resilient elastomeric sealing ring having in its relaxed state an axial height greater than said fixed height and on at least its top portion a radial thickness greater than the radial distance between said inner cylindrical surface and said fixed inner diameter so that when said filter is in place under the cover in said canister the sealing ring is compressed in both its radial and axial dimensions so as to form a seal between the filter and the canister.

* * * * *